(12) United States Patent
Somers (10) Patent No.: US 10,725,970 B2
(45) Date of Patent: Jul. 28, 2020

(54) BLOCK STORAGE DEVICE WITH OPTIONAL DEDUPLICATION

(71) Applicant: Alan William Somers, Longmont, CO (US)

(72) Inventor: Alan William Somers, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 425 days.

(21) Appl. No.: 15/725,880

(22) Filed: Oct. 5, 2017

(65) Prior Publication Data

US 2019/0108238 A1 Apr. 11, 2019

(51) Int. Cl.
*G06F 16/00* (2019.01)
*G06F 16/174* (2019.01)
*G06F 16/13* (2019.01)
*G06F 16/17* (2019.01)

(52) U.S. Cl.
CPC ........ *G06F 16/1748* (2019.01); *G06F 16/137* (2019.01); *G06F 16/1727* (2019.01)

(58) Field of Classification Search
CPC . G06F 16/1748; G06F 16/1727; G06F 16/137
See application file for complete search history.

(56) References Cited

U.S. PATENT DOCUMENTS

| | | | |
|---|---|---|---|
| 9,158,540 B1 | 10/2015 | Tzelnic | |
| 9,317,216 B1 | 4/2016 | O'Brien | |
| 9,733,836 B1 * | 8/2017 | Garg | G06F 3/0631 |
| 9,852,076 B1 * | 12/2017 | Garg | G06F 16/172 |
| 10,037,337 B1 * | 7/2018 | Shanmuganathan | G06F 3/0608 |
| 10,540,328 B1 * | 1/2020 | Mankude | G06F 16/182 |
| 2011/0060887 A1 * | 3/2011 | Thatcher | G06F 3/0604 711/171 |
| 2011/0066666 A1 * | 3/2011 | Takaoka | G06F 16/1752 707/816 |
| 2013/0086006 A1 | 4/2013 | Colgrove | |
| 2013/0232292 A1 | 9/2013 | Bandic et al. | |
| 2014/0019680 A1 | 1/2014 | Jin | |
| 2015/0261776 A1 * | 9/2015 | Attarde | G06F 16/1748 707/664 |
| 2016/0283372 A1 * | 9/2016 | Davis | G06F 12/0261 |
| 2016/0321290 A1 * | 11/2016 | Luthra | G06F 16/183 |
| 2017/0031994 A1 * | 2/2017 | Patterson, III | G06F 3/0608 |
| 2017/0220295 A1 * | 8/2017 | Khan | G06F 3/0608 |
| 2018/0196609 A1 * | 7/2018 | Niesen | G06F 3/0608 |
| 2018/0253255 A1 * | 9/2018 | Jain | G06F 11/1453 |
| 2019/0026042 A1 * | 1/2019 | Gupta | G06F 3/0641 |
| 2019/0073151 A1 * | 3/2019 | Marinescu | G06F 3/0641 |

* cited by examiner

*Primary Examiner* — Alexander Khong
(74) *Attorney, Agent, or Firm* — Kenneth Altshuler (57) ABSTRACT

A method for using a block storage device for storing and reproducing electronic files is disclosed. The block storage device includes blocks, each one possessing a logical block address (LBA) unique to that block. The method includes providing a deduplication pathway, including a deduplication data structure (DDS), and a block indirection pathway, including a block indirection data structure (BIDS). When receiving an electronic file, if deduplication is desired for the electronic file, then processing the electronic file only through the deduplication pathway, and, otherwise, processing the electronic file only through the block indirection pathway.

19 Claims, 10 Drawing Sheets

BLOCK STORAGE DEVICE WITH OPTIONAL DEDUPLICATION

CROSS-REFERENCE TO RELATED APPLICATIONS

None.

BACKGROUND OF THE INVENTION

1. Field of the Invention

The present invention relates to storage devices and, more particularly, to block storage devices and administration thereof.

2. Description of Related Art

Certain file systems used to control block storage devices with random access and storage capability, such as hard disk drive (HDD), shingled magnetic recording (SMR) HDD, and solid state drive (SSD), include optimization schemes related to data storage and retrieval processes. For example, the block allocation for certain types of files, such as multiple files containing duplicative records, may be optimized by deduplication processes. Additionally, blocks may be relocated once records are deleted using block relocation processes. Such optimization schemes, however, are not necessarily mutually compatible and also may not be compatible for certain types of block storage devices.

It is generally to this subject matter that embodiments of the present disclosure is directed.

SUMMARY OF THE INVENTION

The present invention relates generally to a method for using a block storage device for storing and reproducing electronic files. Certain embodiments envision the block storage devices including a plurality of blocks, each one of the plurality of blocks possessing a logical block address (LBA) unique to that block within the block storage device, and each one of the electronic files includes file meta data and a plurality of records. The method includes providing a deduplication pathway, including a deduplication data structure, and providing a block indirection pathway, including a block indirection data structure. The deduplication data structure and the block indirection data structure are stored on an associated storage device, such as a flash drive, connected with the block storage device. The method further includes receiving an electronic file at the block storage device, and determining whether deduplication is desired for the electronic file so received. The determination is performed, for example, by a host computer as will be described in detail at the appropriate juncture below. The setting of whether deduplication is desired is specified, for example, by a file system administrator for certain types of files, as will be discussed below. If deduplication is desired for the electronic file so received, then the method includes processing the electronic file through only the deduplication pathway. If deduplication is not desired for the electronic file so received, then the method includes processing the electronic file through only the block indirection pathway. The deduplication data structure contains information relating to a cryptographic hash for each record to a first LBA, at which deduplicated data referenced by the cryptographic hash is stored, the cryptographic hash being assigned to a first record out of the plurality of records in the electronic file for which deduplication is desired. The block indirection data structure contains information relating a block identifier (block ID) to a second LBA, such as from a different electronic file, at which the second record is stored on the block storage device, the block ID being assigned to a second record out of the plurality of records in the electronic file for which deduplication is not desired.

Embodiments of the present disclosure contemplate a method for using a block storage device for storing and reproducing electronic files. The block storage device includes a plurality of blocks, each one of the plurality of blocks possessing a logical block address (LBA) unique to that block within the block storage device. Each one of the electronic files includes file metadata and a plurality of records. The method includes providing a block storage device and a file system for controlling the block storage device. The method further includes receiving an electronic file at the file system, and determining whether deduplication is desired for the electronic file so received. If deduplication is desired for the electronic file so received, the method includes setting a deduplication indicator to positive. If deduplication is not desired for the electronic file so received, the method includes setting the deduplication indicator to negative. The method further includes appending the deduplication indicator to the file metadata of the electronic file so received. For each record in the electronic file so received, if the deduplication indicator is positive, then the method further includes calculating a cryptographic hash, and looking up the cryptographic hash in a deduplication data structure within the file system. The deduplication data structure is stored on an associated storage device, such as a flash drive, connected with the block storage device. If the cryptographic hash does not already exist in the deduplication data structure, then the method further includes writing the cryptographic hash to an available block in the block storage device, storing the LBA of the available block so written in the deduplication data structure, and appending the cryptographic hash and the LBA of the available block so written onto the file metadata. If the deduplication indicator is negative, then the method further includes assigning a block ID to the record, writing the record to an available block in the block storage device, storing the block ID and LBA of the available block so written in a block indirection data structure within the file system, and appending the block ID and LB of the available block so written onto the file metadata. The block indirection data structure is also stored on an associated storage device connected with the block storage device, either the same associated storage device as the deduplication data structure, or on a separate associated storage device, such as another flash drive.

Other embodiments contemplate including using a reference counter in the method. The method further includes setting the reference count for the LBA to 1, if the cryptographic hash does not already exist in the deduplication structure, or, if the cryptographic hash already exists in the deduplication data structure, then incrementing the reference count for the LBA so found by 1.

Further embodiments of the present disclosure contemplate the method including a process for reconstructing electronic files from the block storage device. The method further includes identifying an electronic file to be read, and accessing the file metadata for the electronic file to be read. For each record in the electronic file to be read, if the deduplication indicator in the file metadata is positive, then finding the cryptographic hash for the record in the file metadata, and finding the LBA corresponding to the cryptographic hash in the deduplication data structure. If the deduplication indicator is negative, then finding the block ID corresponding to the record in the file metadata, finding the LBA corresponding to the block ID so found in the block indirection data structure. In either case, reading the block corresponding to the LBA so found, recreating the electronic file to be read by combining data read from the blocks for every record in the electronic file to be read, and transferring the electronic file so recreated to the user.

BRIEF DESCRIPTION OF THE DRAWINGS

The invention will be described with reference to the accompanying drawings, wherein.

DETAILED DESCRIPTION OF EMBODIMENTS OF THE INVENTION

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of file systems for controlling block storage devices. In what follows, similar or identical structures may be identified using identical callouts.

Figure 1:
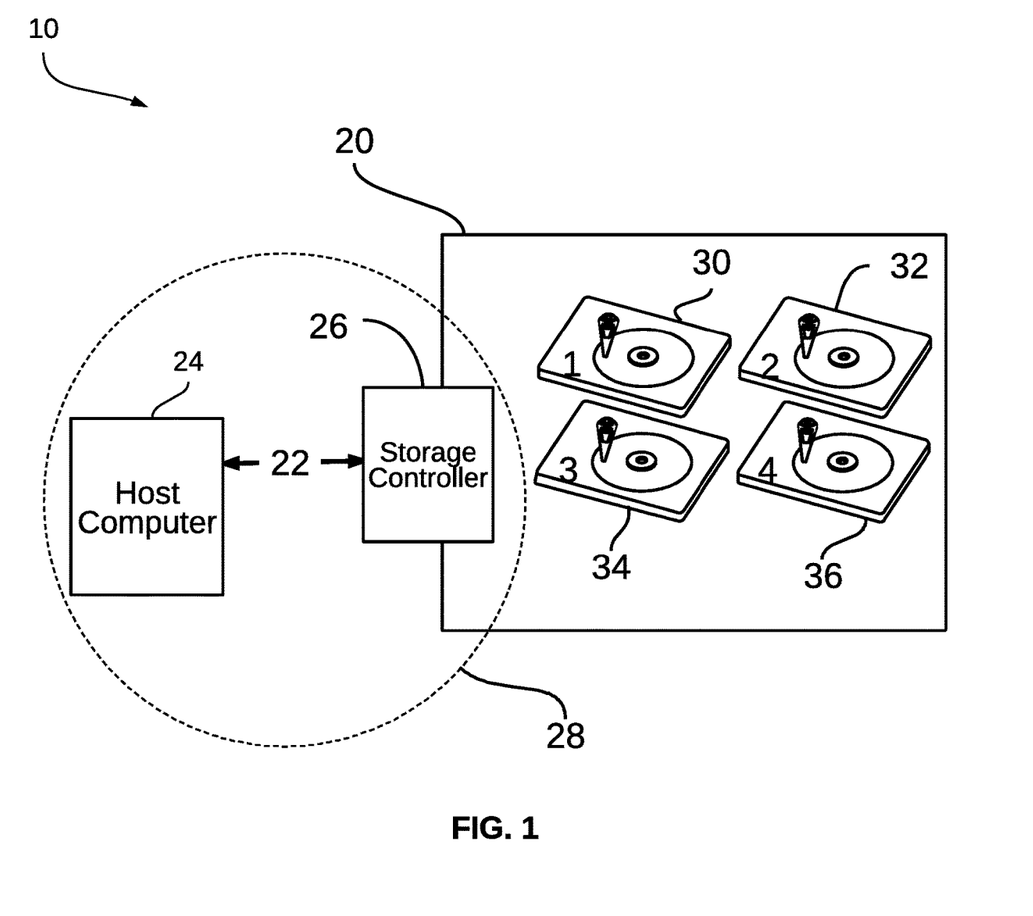
FIG. 1 depicts an embodiment of a data storage arrangement 200 constructed in accordance with various embodiments of the present invention.

In an exemplary environment in which embodiments of the present invention may be practiced, FIG. 1 depicts a data storage arrangement 10 constructed in accordance with various embodiments of the present disclosure. Data storage arrangement 10 may generally include a block storage device 20. Block storage device 20 is a mass storage system that can utilize non-volatile/non-transient memory. Block storage device 20 may send and receive electronic files (not shown) via a communication channel 22 between a host computer 24 and a storage controller 26. Host computer 24, communication channel 22, and storage controller 26 may together be referred to as a file system 28 for controlling the behavior of block storage device 20.

Block storage device 20 may further include, for example, one or more HDDs, such as HDDs 30, 32, 34, and 36 shown in FIG. 1. Each one of HDDs 30, 32, 34, and 36 includes a plurality of blocks for recording data thereon, each one of the plurality of blocks being identified by a unique logical block address (LBA).

While shown as HDDs in FIG. 1, it is noted that one or more of HDDs 30, 32, 34, and 36 may be replaced by other types of block storage devices, such as flash drives, SMR HDDs, SSDs and the like, or a combination of different types of storage devices. Although not shown in the present embodiment, data storage arrangement 10 may include a variety of additional components such as bus system, volatile memory, graphical user interface (GUI), central processing unit (CPU) and fans, which are considered to be within the scope and spirit of the present disclosure.

Figure 2:
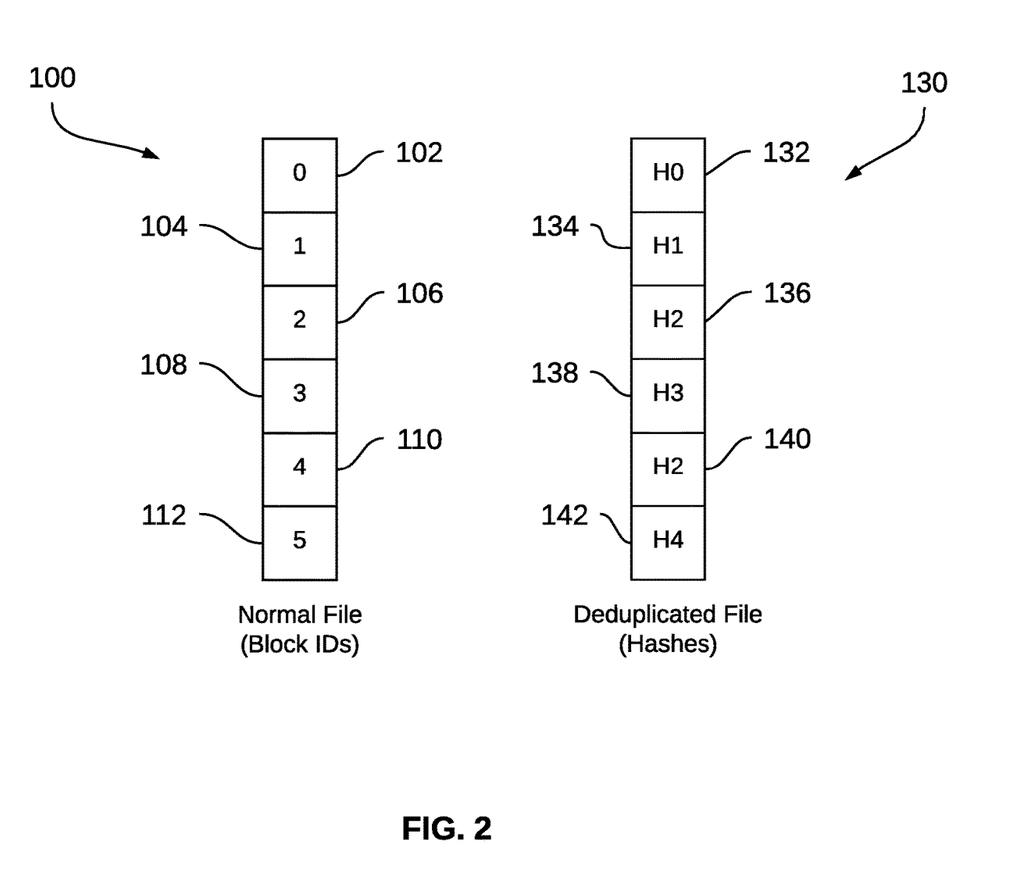
FIG. 2 depicts a comparison of the format of a normal file, including blocks identified by block IDs, and the format of a deduplicated file, including blocks identified by cryptographic hashes.

Referring to FIG. 2 in conjunction with FIG. 1, an electronic file received at host computer 24 may be a normal file, with records within the file being designated by block IDs, or a deduplicated file, with records within the file being designated by cryptographic hashes. FIG. 2 illustratively depicts a normal file 100 and a deduplicated file 130. In block storage, electronic files are split into evenly-sized blocks of data (i.e., records), each record being stored at a particular block with a unique LBA. As shown in FIG. 2, normal file 100 includes a plurality of records 102, 104, 106, 108, 110, and 112, each record being designated by a unique block ID, shown as 0, 1, 2, 3, 4, and 5, respectively. In contrast, deduplicated file 130 again includes a plurality of records 132, 134, 136, 138, 140, and 142, each record being designated by a cryptographic hash. However, in deduplicated file 130, records 136 and 140 are duplicates so are designated by the same cryptographic hash H2, while records 132, 134, 138, and 142 are designated by distinct cryptographic hashes H0, H1, H3, and H5, respectively.

Figure 3:
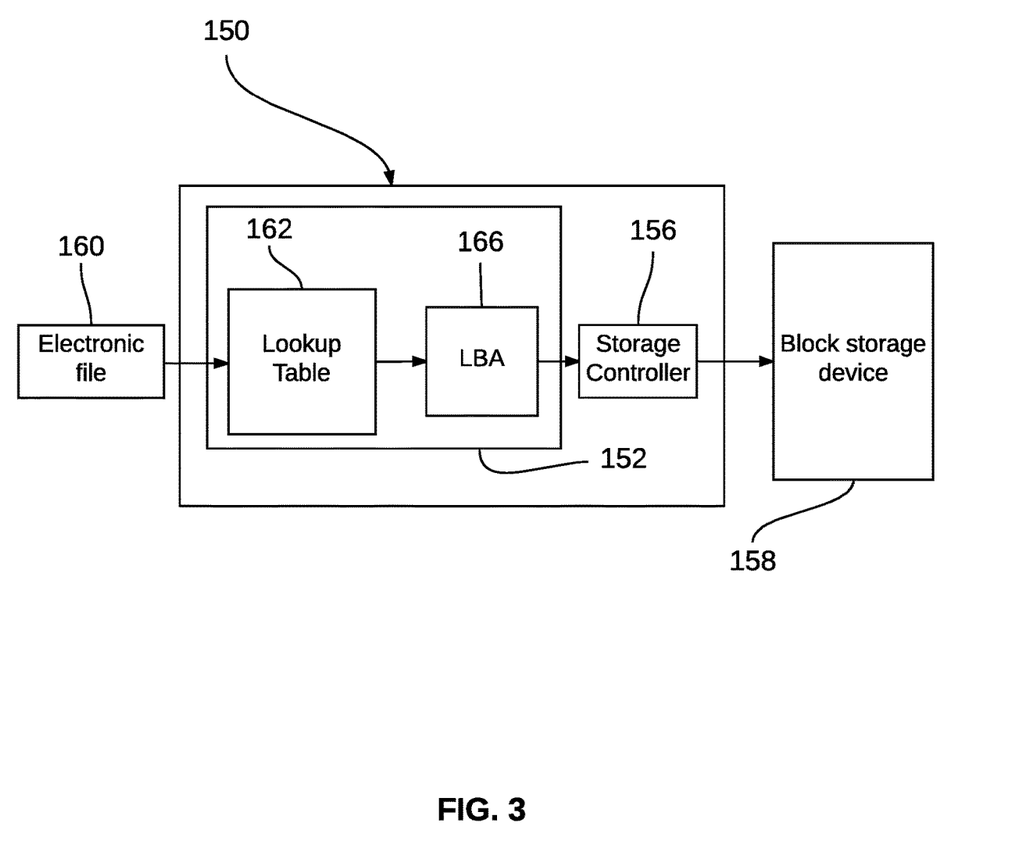
FIG. 3 illustratively depicts a conventional file processing scheme, showing how normal and deduplicated files are processed within conventional file systems.

The process of how a conventional file system processes electronic files is shown in FIG. 3. A conventional file system 150 includes a host computer 152 in electronic communications with a storage controller 156, which controls a block storage device 158. When an electronic file 160 is received at host computer 152, conventional file system 150 processes the electronic file to locate available blocks within block storage device 158.

If conventional file system 150 is configured for processing normal files, such as normal file 100, the records within electronic file 160 are stored in available blocks within block storage device 158, and conventional file system 150 stores the LBAs of the blocks so used as well as their corresponding block IDs of the stored records within the electronic file in a look-up table 162. In the case of a normal file, look-up table 162 connects LBAs of the physical blocks of block storage device 158 with block IDs of the stored records within electronic file 160. A similar process is followed when reconstructing electronic file 160, during which look-up table 162 is used to locate the LBAs of the physical blocks of block storage device 158 corresponding to the block IDs of the records within electronic file 160, then the records stored at those located LBAs are retrieved to reconstruct electronic file 160.

Alternatively, conventional file system 150 may also be set to better utilize the storage space available in block storage device 158 by deduplicating redundant records. While details of deduplication procedures are considered outside of the scope of the present disclosure, it may be noted that, conventionally, the decision of whether to apply the deduplication process to files processed by file system 28 is made by the file system administrator and is not made on the fly as electronic files are processed.

If conventional file system 150 is configured to implement deduplication processes, then the non-duplicate records within electronic file 160 are stored in available blocks within block storage device 158, and their corresponding cryptographic hashes and LBAs of the blocks so used are stored within look-up table 162. If there are duplicate records within electronic file 160, either within electronic file 160 or with another stored record within block storage device 158, then that information is also stored within look-up table 162. In the case of deduplicated files, look-up table connects, points to, LBAs of the physical blocks of block storage device 158 with cryptographic hashes associated with the respective records within electronic file 160. Again, similar process is followed when reconstructing electronic file 160, during which look-up table 162 is used to locate the LBAs of the physical blocks of block storage device 158 corresponding to the cryptographic hashes of the records within electronic file 160, including those corresponding to duplicate records. Then the records stored at those located LBAs are retrieved to reconstruct electronic file 160.

In general, conventional file system 150 is limited in that electronic file 160 can be processed either as a normal file or as a deduplicated file, not both, along a single processing path; that is, the decision to implement a deduplication procedure is made globally for the file system, and exceptions cannot be made to handle both normal and deduplicated files simultaneously along the single processing path. In other words, while the decision to implement deduplication or not in processing electronic files may be optional at the file system administrator level, a conventional file system cannot ad hoc toggle between handling a normal file and a deduplicated file.

Figure 4:
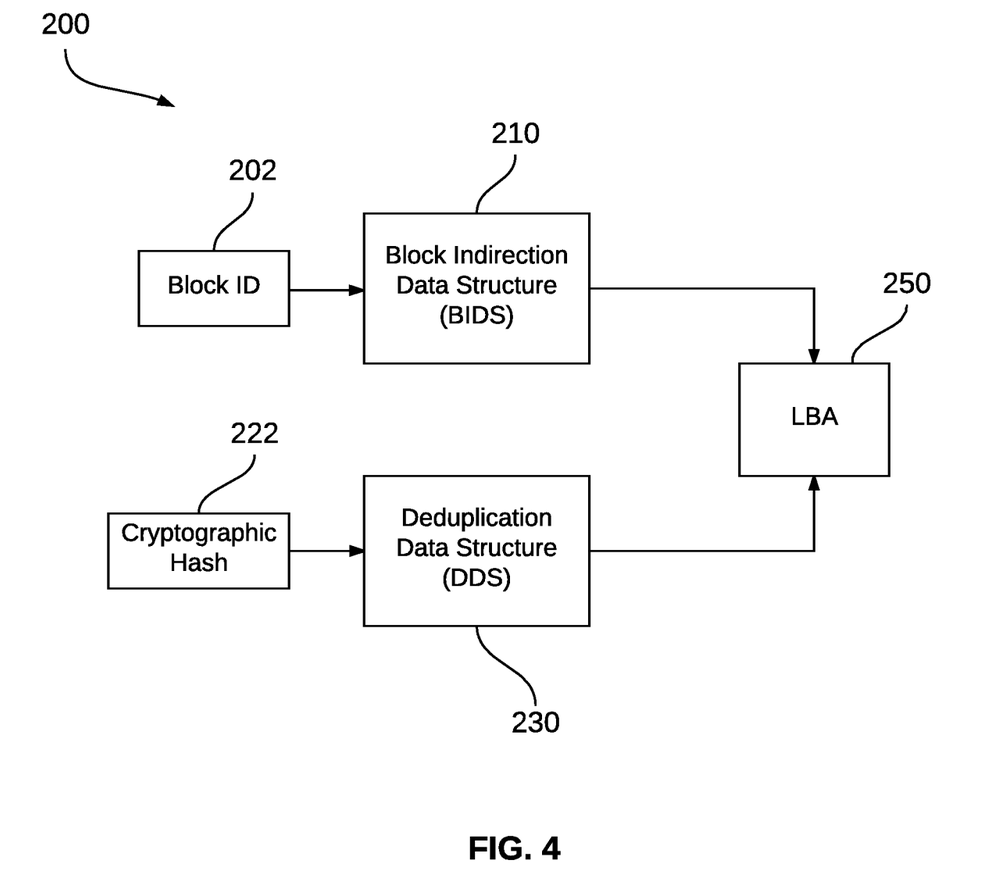
FIG. 4 illustratively depicts a file processing scheme, in which the normal file and the deduplicated file are processed via distinct, parallel pathways, in accordance with embodiments of the present invention.

In contrast, referring to FIG. 1 and FIG. 4, file system 28 of the present disclosure provides parallel paths to simultaneously handle normal and deduplicated files consistent with embodiments of the present invention. File system 28 determines whether deduplication is desired for a specific electronic file received at host computer 24.

In accordance with an embodiment, when an electronic file is received at host computer 24, host computer 24 may designate whether the electronic file should be deduplicated. For example, for certain types of electronic files, such as electronic mail files or other types of files that are known to contain a significant amount of information redundant with other files, then host computer 24 may tag those files to be processed through a deduplication pathway. Other file types may be recognized by host computer 24 as being less redundant content, thus those files may be identified for processing through a pathway that does not involve deduplication processes. While the decision to enable deduplication may be set by the file system administrator, file system 28 is configured to allow the processing of both normal and deduplicated files, as will be described in further detail hereinafter.

A key aspect of file system 28 is the implementation of two parallel paths for processing both normal and deduplicated files, as shown in FIG. 4. If a normal file is received at host computer 24, a block ID 202 of a given record within the electronic file is processed through a Block Indirection Data Structure (BIDS) 210, which notes the link between block ID 202 and an LBA 250 of the physical block within the block storage device. Particularly, in the case of a normal file, BIDS 210 connects block ID 202 of the given record with LBA 250 of the physical block of the block storage device. A similar process is followed when reconstructing the normal file, during which BIDS 210 is used to locate the LBAs of the physical blocks of block storage device corresponding to the block IDs of the records within the normal file, then the records stored at those located LBAs are retrieved to reconstruct normal file. As previously described BIDS 210 is stored in an associated storage device, such as a flash drive, that is connected with the block storage device.

At the same time, continuing to refer to FIG. 4, if a file to be deduplicated is received at host computer 24, a cryptographic hash 222 of a given record within the electronic file is processed through a Deduplication Data Structure (DDS) 230, in which information linking cryptographic hashes and LBAs, including all references to duplicate records, is stored. Again, the same process would be used to locate the LBAs corresponding to the records within a deduplicated file to be retrieved. As discussed above, DDS 230 is located in an associated storage device connected with and separate from the block storage device.

It should be noted that "data structure" refers to, for example, a look-up table in which relationships and correspondences between certain types of data are stored. For instance, the block indirection data structure may contain the reference information corresponding specific block IDs to the specific LBAs at which data related to the records identified by the block IDs are stored. Similarly, the deduplication data structure may contain reference information corresponding specific cryptographic hashes to specific LBAs at which data related to the records identified by the cryptographic hashes, including duplicate records, are stored.

Figure 5:
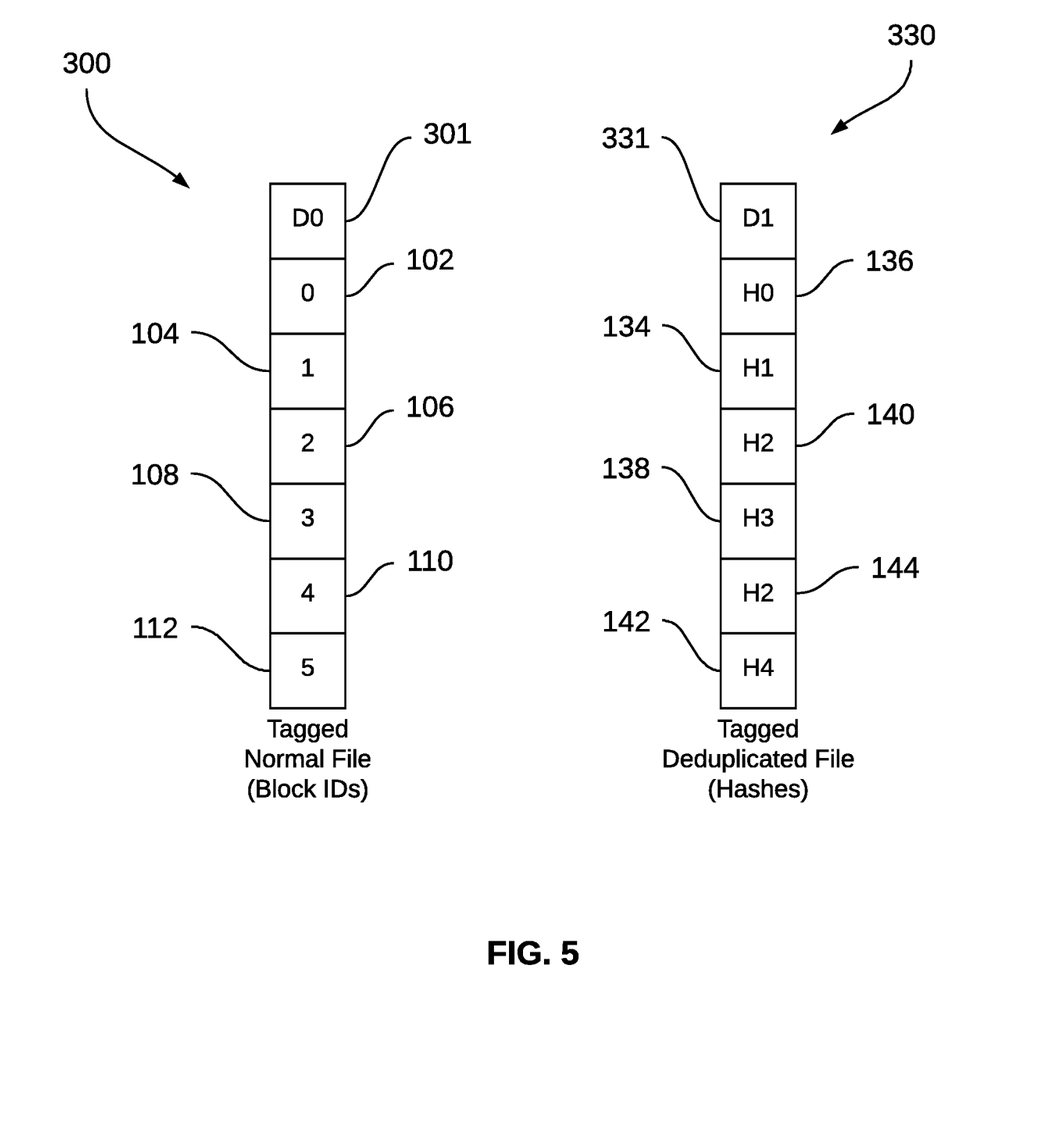
FIG. 5 depicts a comparison of the format of the normal and deduplicated files of FIG. 1, this time tagged with deduplication indicators, in accordance with embodiments of the present invention.

In order to allow the use of the parallel processing paths, such as shown in FIG. 4, a deduplication indicator is added to the metadata of the electronic file when the electronic file is received at host computer 24. As discussed above, the deduplication indicator is added by host computer 24 in accordance with settings by a file system administrator, for instance, to enable deduplication for certain types of files and not for other types of files. Examples of normal and deduplicated files including deduplication indicators are shown in FIG. 5. As shown in FIG. 5, a normal file 300 further includes a deduplication indicator 301, in addition to the records identified by block IDs of normal file 100 of FIG. 2. Similarly, a deduplicated file 330 includes a deduplication indicator 331, in addition to the records identified by cryptographic hashes of deduplicated file 130 of FIG. 2. Deduplication indicators 301 and 331 are stored within the metadata of normal and deduplicated files 300 and 330, respectively. For instance, deduplication indicator 330, shown as "DO," may correspond to an indication that the file has not been processed through a deduplication process similarly, deduplication indicator 331, shown as "Dl," may correspond to an indication that the file has been processed through a deduplication process such that there may be duplicate records within the file.

Figure 6:
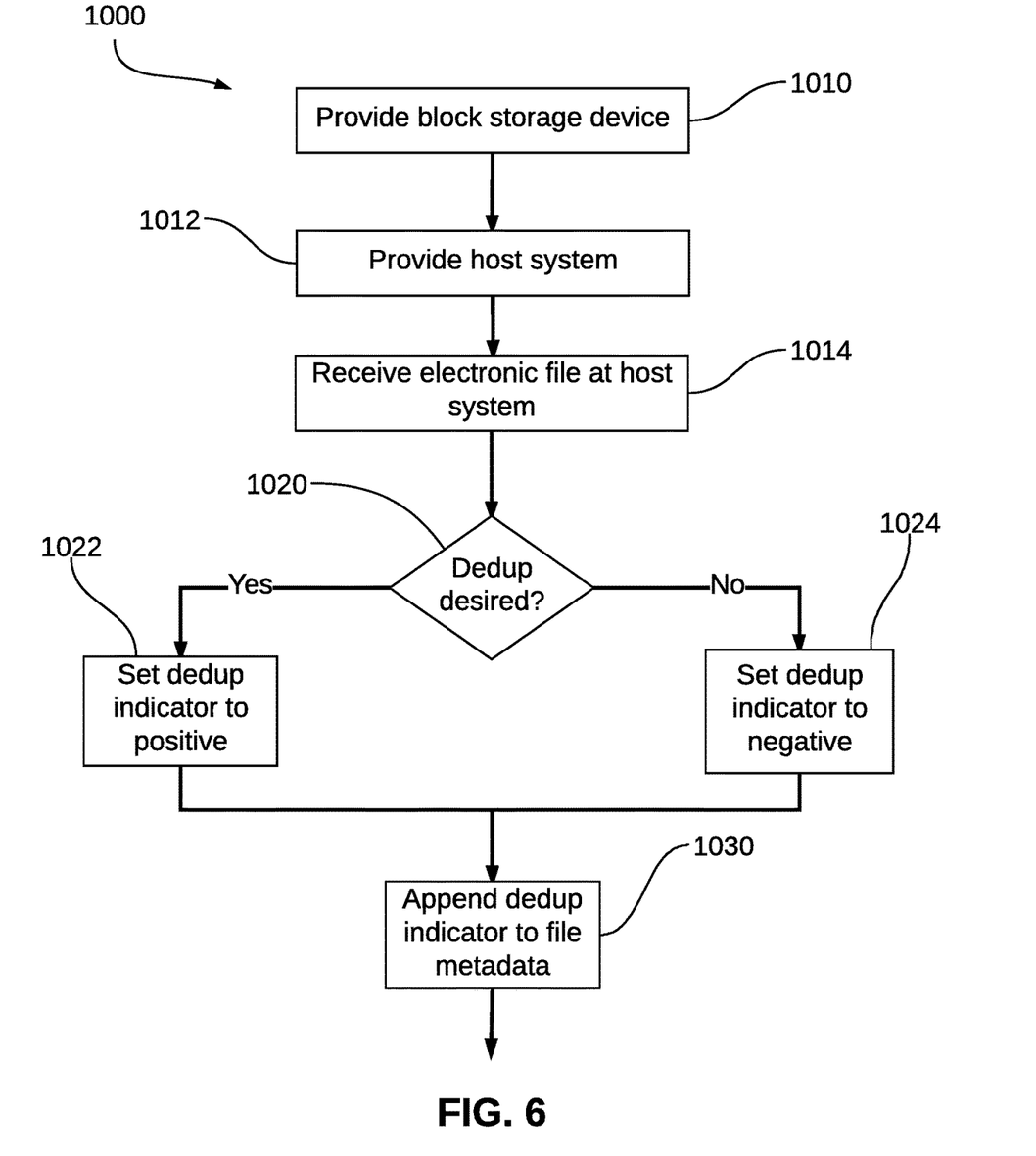
FIG. 6 is a block diagram of method steps consistent with embodiments of the present invention.
Figure 7:
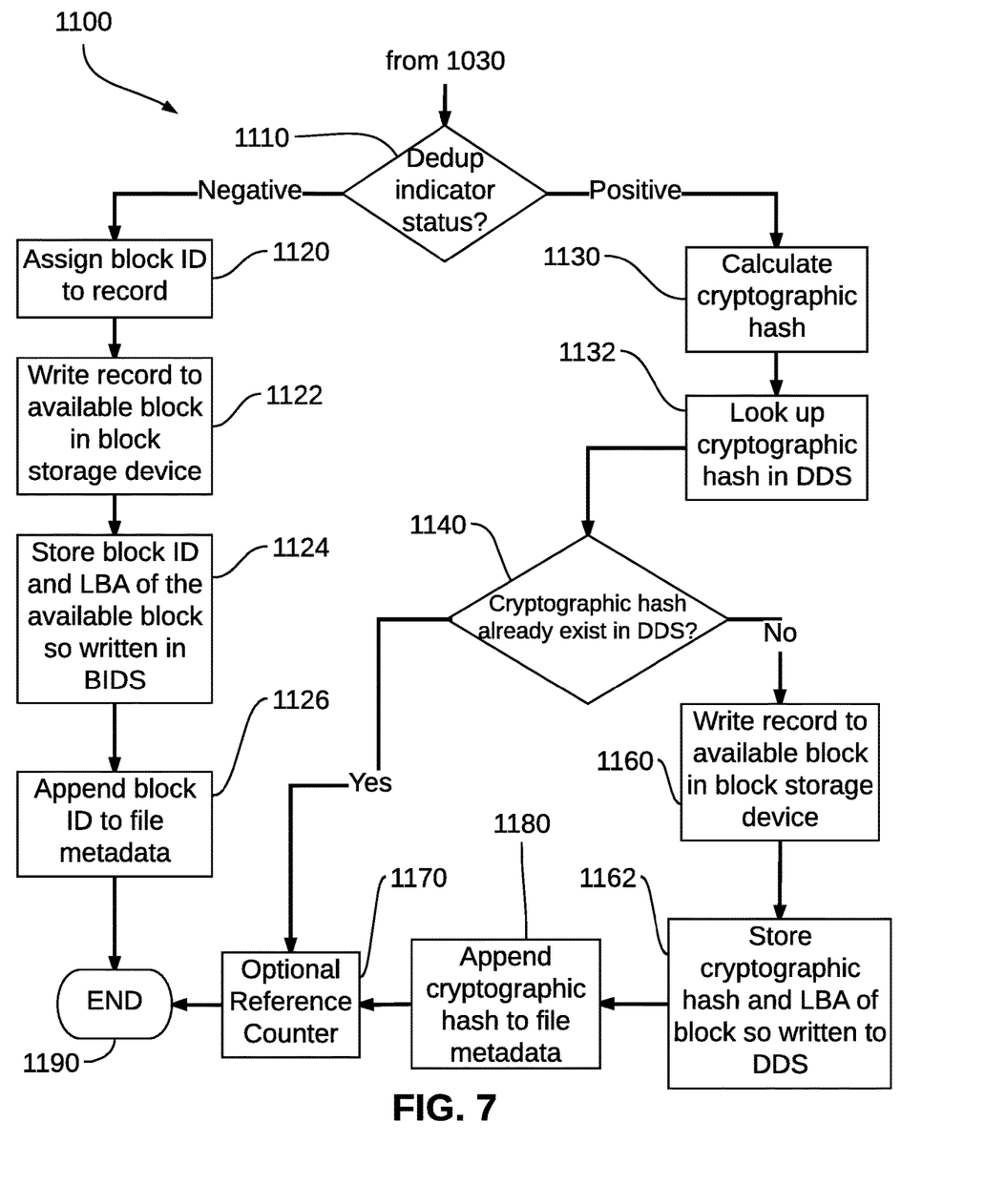
FIG. 7 is another block diagram of more method steps consistent with embodiments of the present invention.

Referring now to FIGS. 6 and 7, the process the file system follows to write an electronic file to a block storage device, in accordance with an embodiment, is described in detail. As shown in FIG. 6, process 1000 includes a step 1010 to provide a block storage device, and a step 1012 to provide a host system. An electronic file is received at the host system in a step 1014. At a decision 1020, a determination is made whether or not the electronic file will be processed using a deduplication process. This determination may be set for specific types of files for certain files received under specified conditions, for example, by the file system administrator. As described above, the file system administrator may desire deduplication for certain types of files known to include a high degree of redundancy between files, while opting not to perform deduplication processes for other types of files that do not generally include redundant information. If decision 1020 is "Yes," then a deduplication indicator is set to positive in a step 1022, and the deduplication indicator so set is appended to the file metadata in a step 1030. If decision 1020 is "No," then the deduplication indicator is set to negative in a step 1024, and again the deduplication indicator is appended to the file metadata in step 1030.

It is noted that this determination of the deduplication status at decision 1020 is a key aspect of the described embodiment of optional deduplication. Unlike previous file systems, in which whether or not all electronic files would be processed using a deduplication algorithm is set globally, the embodiments of the present disclosure allow the determination to be set at a file-by-file basis such that both normal and deduplicated files may be processed in custom ways. In other words, the use of the deduplication indicator facilitates the use of parallel processing paths for normal and deduplicated files such that not all files need to be processed as a deduplicated file, and vice versa. This characteristic supports desired processing for both types of files, and allows further advantages, as described in further detail hereinafter.

Referring now to FIG. 7, a process 1100 continues from step 1030 of process 1000 of FIG. 6. In a decision 1110, the status of the deduplication indicator in the file metadata is verified. If the deduplication indicator is negative, the received electronic file is not processed through a deduplication process. Then, for each record within the file, a block ID is assigned to the record in a step 1120. The record is written to an available block in the block storage device in a step 1122, and the block ID of the record as well as the LBA of the available block so written with the record are stored in the BIDS. Finally, data regarding the block ID of the record and LBA, at which the record is written, are appended to the metadata of the electronic file in a step 1126, and the process is ended in a step 1190.

In parallel, if in decision 1110, the status of the deduplication indicator in the file metadata is found to be positive, then a deduplication process is used to process the electronic file. For each record in the electronic file, a cryptographic hash is calculated in a step 1130. In a step 1132, the file system looks in the DDS whether this cryptographic hash already exists in the DDS. In a decision 1140, if it is determined that the cryptographic hash already does exist in the DDS, then process 1100 may continue to an optional reference counter step 1170, at which the number of times a particular cryptographic hash is referenced in the DDS is counted. For example, in the case where decision 1140 has determined that a newly calculated cryptographic hash does not yet exist in the DDS, then a new count is started at one. Finally, after step 1170, the cryptographic hash and the LBA corresponding to the particular record are appended to the metadata of the electronic file in a step 1180, and the process ends in step 1190.

If the cryptographic hash is not found in the DDS in decision 1140, then the record is written to an available block in the block storage device in a step 1160, and cryptographic hash and the LBA of the block so written are stored in the DDS. The cryptographic hash is also appended to the file metadata in a step 1180. Optionally, the optional reference counter is incremented by one in step 1170, then the process ends in step 1190.

While the reference counter of FIG. 7 is considered optional to process 1100, step 1170 does become crucial if block relocation will be performed for certain types of block storage devices, as will be discussed in further detail hereinafter.

In improving the way data is stored to and retrieved from a block storage device, the file system administering the host computer and storage controller may be configured in a variety of ways. For instance, as previously mentioned, the file system may implement a deduplication process such that duplicate records are stored in one block and referenced multiple times, rather being stored in multiple blocks. Another optimization scheme is to defragment the block storage device such that, as files are written and deleted, the occupied blocks and the available blocks are consolidated in separate clusters. The defragmentation process is often referred to as block relocation or "garbage collection."

However, these optimization schemes may not be mutually compatible for the block storage device to function efficiently. As an example, in an ordinary file system, as shown in FIG. 3, the file system is preset to process both normal files and deduplicated files along a single processing path such that, even if a normal file, without the complication of calculating cryptographic hashes and locating duplicate records, is received, the file system must process the normal file as if it were a deduplicated file in both writing to and reading from the block storage device. Additionally, block relocation processes may be complicated to implement for deduplicated files. For instance, in Shingled Magnetic Recording (SMR) HDDs, the only known way to perform block relocation is to copy the entire contents of the SMR HDDs to a different storage device, deleting all of the data in the SMR HDDs, then recopying the contents back to the SMR HDDs while optimizing the location of the occupied blocks to store files in contiguous blocks as feasible. This process may be time and hardware intensive and, consequently, is rarely implemented by file system administrators, thus leading to block storage devices performing sub-optimally.

Additionally, multiple references to the same data complicates the implementation of block relocation. For instance, deduplication, making a snapshot of a file system, or cloning one file system to create a new file system all may result in having multiple records in different files all pointing to the same stored data.

Embodiments of the present invention circumvent such difficulties in block storage devices by allowing on-the-fly discrimination between normal and deduplicated files, and providing parallel processing paths for normal and deduplicated files, with the block indirection data structure and deduplication data structure stored at the storage pool level of the file system or even on a separate storage device such that the BIDS and DDS are not affected by snapshotting or cloning (i.e., creating a copy of the file system at a particular point in time). Furthermore, using the optional reference counter (e.g., optional reference counter 1170 of FIG. 7) allows block relocation processes for further optimization of the block storage device.

Figure 8:
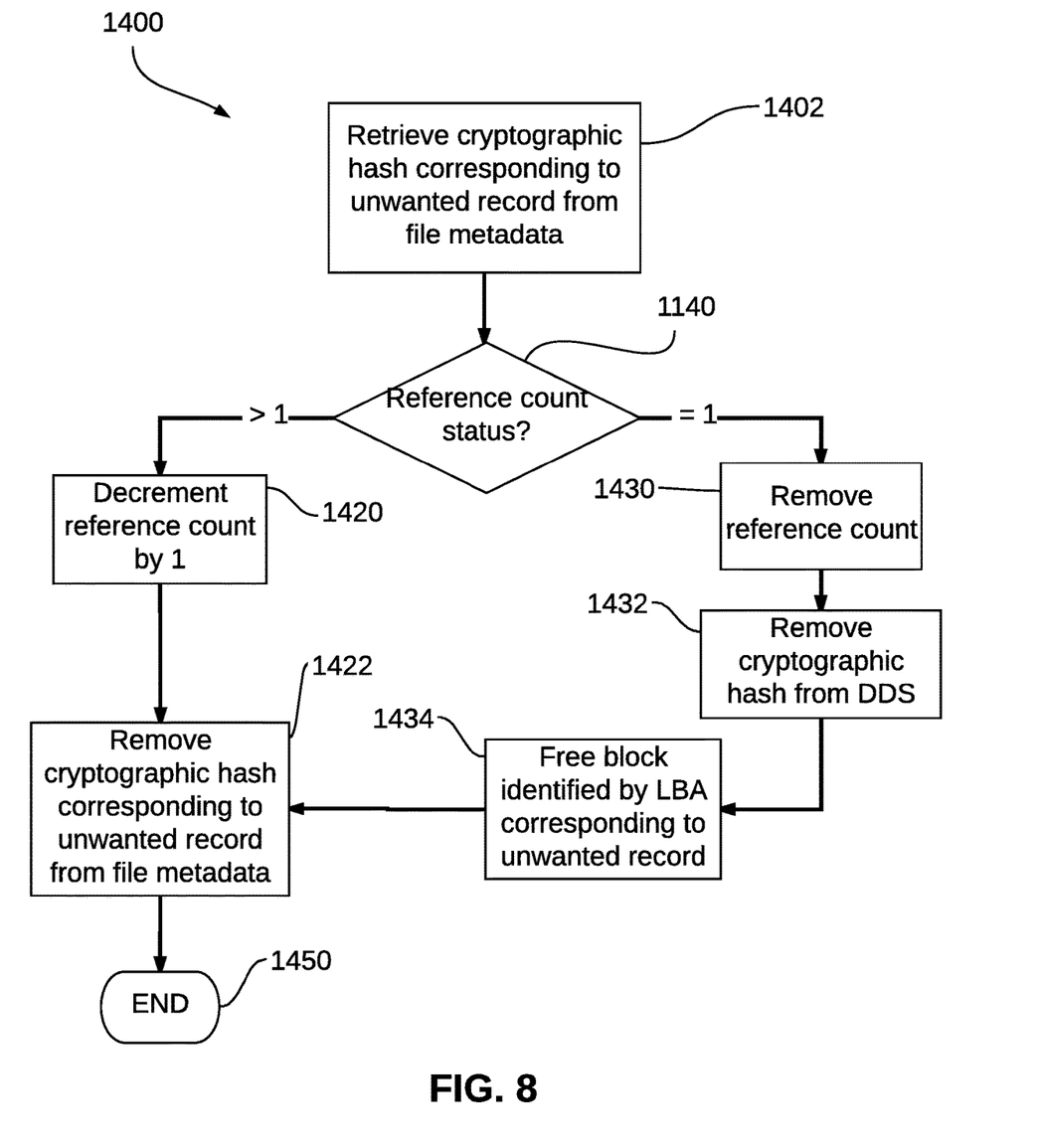
FIG. 8 is still another block diagram of additional method steps consistent with embodiments of the present invention.

Referring to FIG. 8, further details of a process for removing an unwanted, deduplicated record from a block storage device, such as block storage device 20 of FIG. 1, in accordance with an embodiment including the optional reference counter, are described. For instance, when a user or file system administrator desires to remove a file from a block storage device, the process illustrated in FIG. 8 would be used with the data storage arrangement of the present disclosure. Process 1400 begins with a step 1402 to retrieve the cryptographic hash corresponding to the unwanted record from the file metadata. In a decision 1140, the reference count status is determined. If decision 1140 indicates the reference counter is greater than 1, then the reference counter is decremented by 1 in a step 1420, and the cryptographic hash corresponding to the unwanted record is removed from the file metadata in a step 1422. In this case, the block at which the record is stored is not cleared, as there are other records referencing this block, as indicated by the reference count being greater than one.

Continuing to refer to FIG. 8, if decision 1140 indicates that the reference counter equals 1, that means the record being removed is the last reference to the data block. Hence, the reference counter itself is removed in a step 1430, the reference to the cryptographic hash is removed from the deduplication data structure in a step 1432, and the block identified by the LBA corresponding to the unwanted record is removed in a step 1434. Again, the cryptographic hash corresponding to the unwanted record from the file metadata in step 1422. The process is then terminated in an End step 1450.

Another advantage provided by the use of the deduplication indicator as an indicator of the implementation of an optional deduplication algorithm is the enabling of an efficient garbage collection algorithm in any block storage device. In one embodiment, every entry in the deduplication data structure and the block indirection data structure may be restricted to having identical size. In this way, the deduplication data structure and block indirection data structure may be updated, as LBAs are reallocated, within a bounded number of operations, where the number of operations may be specified by a file system administrator, thus avoiding potentially large numbers of operations required for some types of block relocation algorithms when used with block storage devices. For instance, if every entry in the deduplication data structure is identical in size and the deduplication indicator in the file metadata is positive, then the data corresponding to a particular cryptographic hash may be moved from one block, with a first LBA, to another block, with a second LBA, and the LBA entry in the deduplication data structure may simply be updated without altering the file metadata. Similarly, if every entry in the block indirection data structure is identical in size and the deduplication indicator in the file metadata is negative, then the data corresponding to a particular block ID may be moved from one block, with a first LBA, to another block, with a second LBA, and the LBA entry in the block indirection data structure may simply be updated without altering the file metadata. The bounded number of operations for this process is important in ensuring the block relocation process may be performed without undue processing burden.

Figure 9:
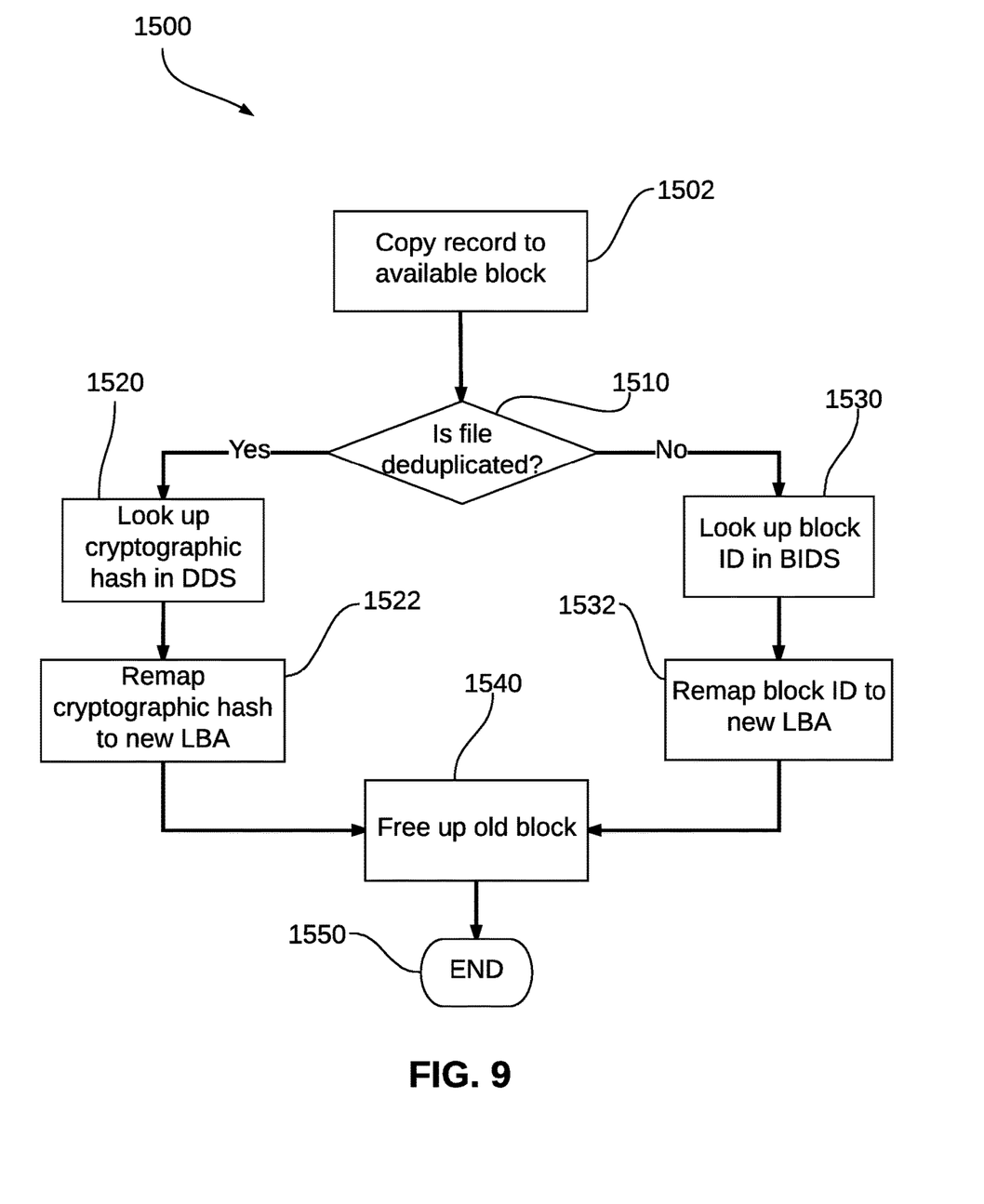
FIG. 9 is yet another block diagram of further method steps consistent with embodiments of the present invention.

Referring now to FIG. 9, a process for relocating a record within a file from one block to another block, such as during a defragmentation or "garbage collection" process is described. In accordance with an embodiment, a process 1500 begins with a step 1502 to copy the record to another available block with a new LBA. Then, a decision step 1510 determines whether the record has been deduplicated. Decision step 1510 may be performed, for instance, by looking up the deduplication indicator in the file metadata. If the answer to decision 1510 is Yes, the file has been deduplicated, then the cryptographic hash corresponding to the LBA of the old block is looked up in the deduplication data structure in a step 1520. The cryptographic hash so found is then remapped to the new LBA, corresponding to the block to which the record has been copied, in a step 1522. The process proceeds to a step 1540 to free up the old block for future record storage.

Still referring to FIG. 9, if the answer to decision step 1510 is No, the file has not been deduplicated thus indicating that the file is a normal file. In this case, the block ID corresponding to the LBA of the old block is looked up in the Block Indirection Data Structure. The block ID is then remapped to the new LBA, corresponding to the block to which the record has been copied in a step 1532. The process again proceeds to step 1540 to free up the old block for future record storage.

The important aspect of process 1500 of FIG. 9 is that the decision to process the file record through either the normal file processing path or the deduplicated file processing path is made ahead of the processing such that the normal file path and the deduplicated file processing paths are provided in parallel, not in series. This characteristic allows the file system of the present disclosure to function in an optimized way for both normal and deduplicated files. Additionally, with the optional reference counter of FIGS. 7 and 8, block relocation of even deduplicated files is enabled.

It is emphasized that the use of the optional reference counter along with the deduplication indicator allows the implementation of block relocation algorithms, which were not previously practical for use with block storage devices due to hardware and time constraints. This enabling of block relocation algorithms for block storage devices, including hard disk drives and shingled magnetic recording HDDs, is considered a breakthrough for further commercial deployment of these high volume, high speed storage devices. For instance, while it is impractical to implement block relocation or garbage collection for block storage devices including one or more SMR HDD with a conventional file system, the methods described herein enables the implementation of block relocation for SMR HDD systems. Thus, embodiments of the present invention allow optimization of block storage devices that had previously been impossible without the innovations described herein.

It is also noted that the read process for electronic files (i.e., reconstructing electronic files that have been stored in the block storage device) may also be optimized by taking advantage of the use of optional deduplication and the deduplication indicator. In a process similar to that shown in FIG. 7, when an electronic file is selected for readout, the file system would first analyze the file metadata to determine the status of the deduplication indicator. For each record in the electronic file to be read, if the deduplication indicator in the file metadata is positive, then the read process would involve finding the cryptographic hash for the record in the file metadata, then locating the LBA corresponding to the cryptographic hash in the deduplication data structure. If the deduplication indicator in the file metadata is negative, then the block ID corresponding to that record is found, then the LBA corresponding to the block ID so found is looked up in the block indirection data structure. That is, again, there are two parallel processing paths provided for the readout process of the electronic file, depending on the status of the deduplication indicator. In either case, once the LBAs of the records within the electronic file to be read have been found, the data at the blocks corresponding to those LBAs are read in order to reconstruct the electronic file.

Figure 10:
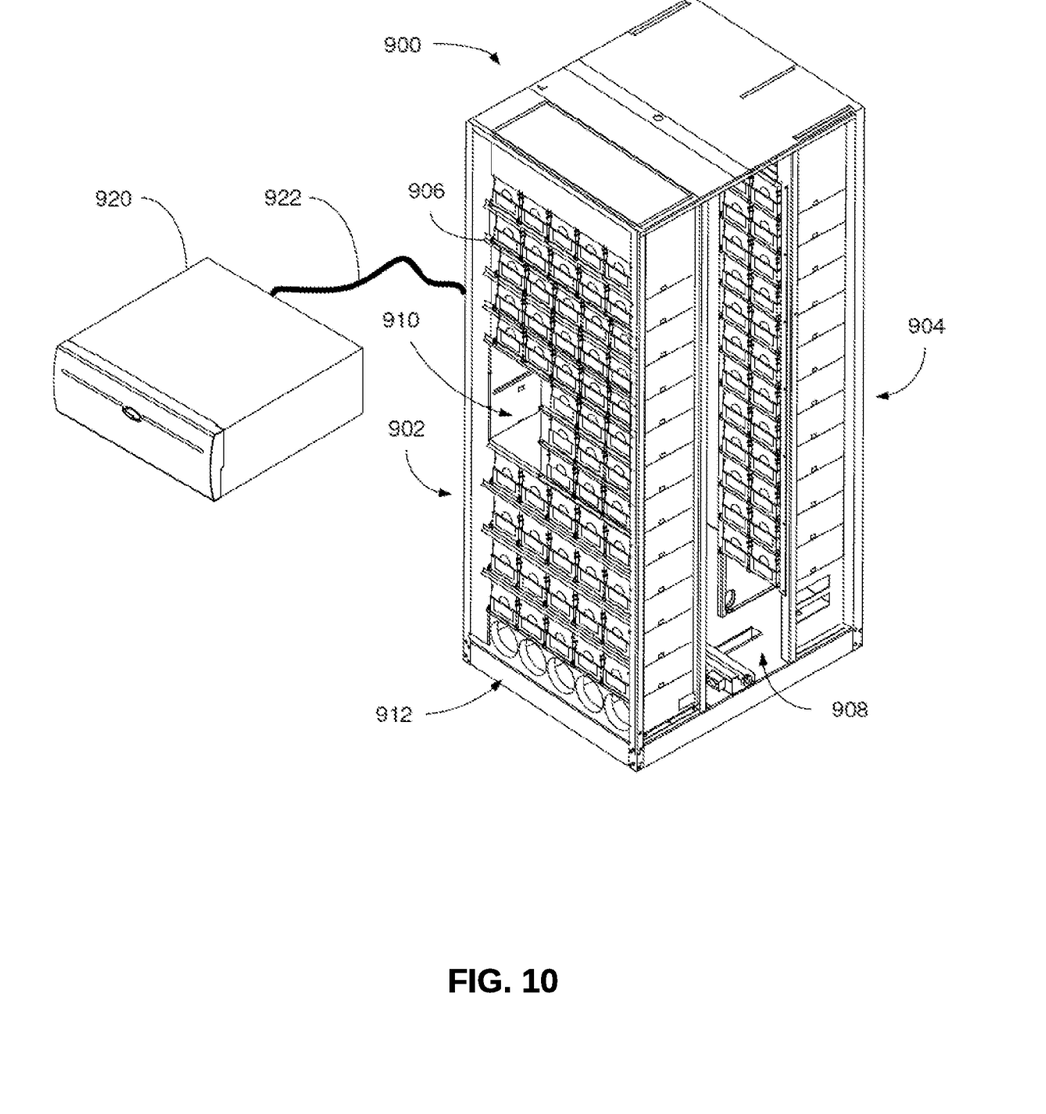
FIG. 10 is a schematic of an exemplary environment wherein embodiments of the present invention may be practiced.

Embodiments of the present invention may be commercially practiced in a Black Pearl archive storage system that possesses a Spectra Logic T-Finity tape cartridge library on the backend manufactured by Spectra Logic of Boulder Colo. FIG. 10 shows a commercial embodiment of one Black Pearl archive storage system 920 communicatively linked with the T-Finity unit 900 via a cable 922. The T-Finity unit 900 is shown without an enclosure, whereby the T-Finity unit 900 is a single cabinet whereby multiple cabinets can be combined to make an expandable library. The Black Pearl archive storage system 920 possesses archive storage controller (not shown) and a plurality of hard disk drives (not shown) and software that facilitates receiving data from a server (not shown), caching that data in at least one of the plurality of hard disk drives, running LTFS software, providing a device driver (such as a SCSI to format data streams to tape format), encoder/decoder software, compression software, and the like in addition to control storing data to tape cartridges in the T-Finity library 900. The Black Pearl archive storage system 920 can complete the methods described herein including optional deduplication and block relocation processes. T-Finity unit 900 includes a first and second shelf system 902 and 904 that are adapted to support a plurality of the mobile media, such as tape cartridge magazines 906 comprising a plurality of LTO-6 tape cartridges, archived in the library 900. Second shelf system 904 includes at least one tape drive (not shown) adapted to read and write data to and from a tape cartridge. Functionally interposed between the first and second shelf system 902 and 904 is a magazine transport space 908. Magazine transport space 908 is adapted to provide adequate space for a tape cartridge magazine 906 to be moved, via a magazine transport (not shown) and cartridge picker device (not shown), from a position in the first shelf system 902, for example, to/near a drive. Tape cartridge magazines 906 may be transferred into and out from the T-Finity library via an entry/exit port 910. Transferring tape cartridge magazines 906 in and out of the T-Finity library may be accomplished by an operator or robotics, for example. The T-Finity library further includes a mechanism for cooling, as exemplified by fans 912 located at the base of T-Finity unit 900.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple HDDs can make up a block storage device system while still maintaining substantially the same functionality without departing from the scope and spirit of the present invention. Another example can include using these techniques with mixed kinds of random access memory devices, such as solid state drives, or other, or a combination of hard disk drives, solid state drives, and other kinds of block storage devices while still maintaining substantially the same functionality without departing from the scope and spirit of the present invention. Further, for purposes of illustration, the terms "one" is synonymous with "a", which may be a first of a plurality. Moreover, elements described herein as a first element (HDD for example) and second element is descriptive to mean a plurality of elements.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

That which is claimed:

1. A method for using a block storage device for storing and reproducing electronic files, the block storage device including a plurality of blocks, each one of the plurality of blocks possessing a logical block address (LBA) unique to that block within the block storage device, and each one of the electronic files including file metadata and a plurality of records, the method comprising:
   providing a deduplication pathway including a deduplication data structure;
   providing a block indirection pathway including a block indirection data structure;
   receiving an electronic file at the block storage device;
   determining whether deduplication is desired for the electronic file so received;
   if deduplication is desired for the electronic file so received, then processing the electronic file through only the deduplication pathway; and
   if deduplication is not desired for the electronic file so received, then processing the electronic file through only the block indirection pathway;
   the deduplication data structure contains information relating a cryptographic hash to a first LBA at which deduplicated data referenced by the cryptographic hash is stored, the cryptographic hash being assigned to a first record out of the plurality of records in the electronic file for which deduplication is desired, and
   the block indirection data structure contains information relating a block identifier (block ID) to a second LBA, at which the second record is stored on the block storage device, the block ID being assigned to a second record out of the plurality of records in the electronic file for which deduplication is not desired.

2. The method of claim 1, further comprising:
   selecting a second electronic file to be read from the block storage device;
   determining whether the second electronic file has been deduplicated;
   if the second electronic file has been deduplicated, then processing the second electronic file through only the deduplication pathway;
   if the second electronic file has not been deduplicated, then processing the second electronic file through only the block indirection pathway; and
   reconstructing the second electronic file.

3. The method of claim 1, wherein determining whether deduplication is desired for the electronic file so received further includes referencing a setting at the block storage device indicating whether deduplication is desired for the electronic file.

4. A method for using a block storage device for storing and reproducing electronic files, the block storage device including a plurality of blocks, each one of the plurality of blocks possessing a logical block address (LBA) unique to that block within the block storage device, and each one of the electronic files including file metadata and a plurality of records, the method comprising:
   providing a block storage device;
   providing a file system for controlling the block storage device;
   receiving an electronic file at the file system;
   determining whether deduplication is desired for the electronic file so received;

if deduplication is desired for the electronic file so received, setting a deduplication indicator to positive;
if deduplication is not desired for the electronic file so received, setting the deduplication indicator to negative;
appending the deduplication indicator to the file metadata of the electronic file so received; and
for each record in the electronic file so received,
A. if the deduplication indicator is positive, then,
A.1. calculating a cryptographic hash,
A.2. looking up the cryptographic hash in a deduplication data structure within the file system,
A.3. if the cryptographic hash does not already exist in the deduplication data structure, then
A.3.a. writing the record to an available block in the block storage device,
A.3.b. storing the cryptographic hash and the LBA of the available block so written in the deduplication data structure, and
A.3.c. appending the cryptographic hash onto the file metadata, and
B. if the deduplication indicator is negative, then,
B.1. assigning a block ID to the record,
B.2. writing the record to an available block in the block storage device,
B.3. storing the block ID and LBA of the available block so written in a block indirection data structure within the file system, and
B.4. appending the block ID onto the file metadata.

5. The method of claim 4, wherein the deduplication data structure includes a reference counter, the method further comprising:
A.3.d. setting the reference count for the LBA to 1.

6. The method of claim 5, further comprising:
A.4. if the cryptographic hash already exists in the deduplication data structure, then incrementing the reference count for the LBA so found by 1.

7. The method of claim 6, further including a process for deleting an unwanted record from the electronic file, the method further comprising:
A.5. from the file metadata of the electronic file, retrieving the cryptographic hash corresponding to the unwanted record,
A.6. in the deduplication data structure, looking up the LBA and reference count of the cryptographic hash corresponding to the unwanted record, and
A.7. if the reference count is greater than 1, then
A.7.a. decrementing the reference count by 1, and
A.7.b. removing the cryptographic hash corresponding to the unwanted record from the file metadata, and
A.8. if the reference count equals 1, then
A.8.a. nulling the reference count,
A.8.b. removing the cryptographic hash from the deduplication data structure,
A.8.c. freeing the block identified by the LBA corresponding to the unwanted record, and
A.8.d. removing the cryptographic hash corresponding to the unwanted record from the file metadata.

8. The method of claim 4, further including a process for reconstructing electronic files from the block storage device, the method further comprising:
identifying an electronic file to be read;
accessing the file metadata for the electronic file to be read;
for each record in the electronic file to be read,
if the deduplication indicator in the file metadata is positive, then
finding the cryptographic hash for the record in the file metadata, and
finding the LBA corresponding to the cryptographic hash in the deduplication data structure, and
if the deduplication indicator is negative, then
finding the block ID corresponding to the record in the file metadata, and
finding the LBA corresponding to the block ID so found in the block indirection data structure,
reading the block corresponding to the LBA so found,
recreating the electronic file to be read by combining data read from the blocks for every record in the electronic file to be read; and
transferring the electronic file so recreated to the user.

9. A method for using a shingled magnetic recording (SMR) hard disk drive (HDD) system, for storing and reading electronic files, the SMR HDD possessing a plurality of shingled bands, each one of the plurality of shingled bands including a plurality of blocks, each one of the plurality of blocks possessing a logical block address (LBA) unique to that block, and each one of the electronic files including file metadata and a plurality of records, the method comprising:
providing at least one SMR HDD;
providing a file system for controlling the SMR HDD;
receiving an electronic file;
setting a deduplication indicator for specifying whether deduplication is desired for the electronic file so received;
appending the deduplication indicator to a file metadata of the electronic file;
if the deduplication indicator is positive, for each record in the electronic file,
calculating a cryptographic hash,
looking up the cryptographic hash in a deduplication data structure,
if the cryptographic hash does not already exist in the deduplication data structure, then
writing the cryptographic hash to an available block in the SMR HDD,
storing in the deduplication data structure the LBA corresponding to the available block so written, and
appending the cryptographic hash and the LBA of the available block so written in the file metadata,
if the cryptographic hash already exists in the deduplication data structure, then
finding the LBA corresponding to a block at which the cryptographic hash is stored, and
appending the cryptographic hash and the LBA so found in the file metadata;
if the deduplication indicator is negative, for each record in the electronic file,
assigning a block ID,
writing the record to an available block in the SMR HDD,
storing in a block indirection data structure the block ID and the LBA corresponding to the available block so written, and
appending the block ID and LBA to the file metadata.

10. The method of claim 9, wherein the deduplication data structure includes a reference counter, the method further comprising,
if the cryptographic hash did not previously exist in the deduplication data structure, then setting the reference counter for the LBA of the available block so written to 1; and if the cryptographic hash already exists in the deduplication data structure, then incrementing the reference counter for the LBA of the block at which the cryptographic hash is stored by 1.

11. The method of claim 10, further including a process for deleting an unwanted record from the electronic file when the deduplication indicator is positive, the method further comprising:
from the file metadata of the electronic file, retrieving the cryptographic hash corresponding to the unwanted record;
in the deduplication data structure, looking up the LBA of the block, at which the unwanted record is stored, and the reference counter corresponding to the LBA;
if the reference counter is greater than 1, then
decrementing the reference counter by 1, and
removing the LBA and cryptographic hash corresponding to the unwanted record from the file metadata, and
if the reference count equals 1, then
nulling the reference counter,
freeing the block identified by the LBA corresponding to the unwanted record, and
removing the LBA and cryptographic hash corresponding to the unwanted record from the file metadata.

12. The method of claim 9, wherein every entry in the deduplication data structure and the block indirection data structure has identical size, the method further comprising:
if the deduplication indicator in the metadata is positive, then
locating the file metadata of the electronic file including a first cryptographic hash,
moving the data corresponding to the first cryptographic hash from a first block with a first LBA to a second block with a second LBA, and
updating the deduplication data structure, replacing the first LBA with the second LBA to correspond to the first cryptographic hash, without altering the file metadata; and
if the deduplication indicator in the file metadata is negative, then
locating the file metadata of the electronic file including a first block ID,
moving the data corresponding to the first block ID from the first block to the second block with the second LBA, and
updating the block indirection data structure, replacing the first LBA with the second LBA to correspond to the first block ID, without altering the file metadata.

13. The method of claim 12, wherein moving the data is performed as a part of a garbage collection process.

14. A method for using a block storage device for storing and reading electronic files, the method comprising:
providing a deduplication pathway including a deduplication data structure;
in parallel to the deduplication pathway, providing a block indirection pathway including a block indirection data structure;
for each electronic file received at the block storage device, storing the electronic file so received by selecting only one of the deduplication pathway and the block indirection pathway for processing the electronic file so received;
selecting an electronic file to be read from the block storage device;
determining whether the electronic file to be read has been deduplicated;
if the electronic file to be read has been deduplicated, then reading the electronic file only via the deduplication pathway; and
if the electronic file to be read has not been deduplicated, then reading the electronic file only via the block indirection pathway.

15. The method of claim 14 wherein the block indirection pathway is devoid of a deduplication method.

16. The method of claim 14 wherein nowhere along the block indirection pathway is there any deduplication capability for the electronic file.

17. The method of claim 14 wherein nowhere along the block indirection pathway is there any hash function generation or use.

18. The method of claim 14 further comprising either funneling the non-deduplicated file to a storage device via the block indirection pathway where the non-deduplicated it file is stored or funneling the deduplicated file to the storage device via the deduplication pathway where the he duplicated file is stored, the deduplication pathway is different than the block indirection pathway.

19. The method of claim 14 further comprising a storage system that comprises two storage pathways consisting of the deduplication pathway and the block indirection pathway, the block indirection pathway incapable of deduplication.

* * * * *